US008650208B2

(12) United States Patent
Bellamkonda

(10) Patent No.: US 8,650,208 B2
(45) Date of Patent: Feb. 11, 2014

(54) METHOD AND SYSTEM FOR ENHANCING SCALABILITY OF ANALYTIC WINDOW FUNCTIONS

(75) Inventor: Srikanth Bellamkonda, Mountain View, CA (US)

(73) Assignee: Oracle International Corporation, Redwood Shores, CA (US)

(*) Notice: Subject to any disclaimer, the term of this patent is extended or adjusted under 35 U.S.C. 154(b) by 322 days.

(21) Appl. No.: 12/848,018

(22) Filed: Jul. 30, 2010

(65) Prior Publication Data

US 2012/0030233 A1 Feb. 2, 2012

(51) Int. Cl.
*G06F 17/30* (2006.01)

(52) U.S. Cl.
USPC .......................................... 707/770; 707/764

(58) Field of Classification Search
None
See application file for complete search history.

(56) References Cited

U.S. PATENT DOCUMENTS

2002/0040639 A1* 4/2002 Duddleson et al. .............. 92/52

OTHER PUBLICATIONS

M. Jaedicke: Parallel Object-Relational Query Processing, LNCS 2169, pp. 14-32, 2001.*
Srikanth Bellamkonda et al., "Enhanced Subquery Optimizations in Oracle", VLDB '09, Aug. 24-28, 2009, Lyon, France, 12 pages.
Won Kim, "On Optimizing an SQL-Like Nested Query", ACM TODS, Sep. 1982, 27 pages.
Umeshwar Dayal, "Of Nests and Trees: A Unified Approach to Processing Queries that Contain Nested Subqueries, Aggregates, and Quantifiers", Proceedings of the 13th VLDB Conference, Brighton, U.K., 1987, 12 pages.
M. Muralikrishna, "Improved Unnesting Algorithms for Join Aggregate SQL Queries", Proceedings of the 18th VLDB Conference, Vancouver, Canada, 1992, 12 pages.
Hamid Pirahesh et al., "Extensible/Rule Based Query Rewrite Optimization in Starburst" Proc. of ACM SIGMOD, San Diego, U.S.A., 1992, 10 pages.
Surajit Chaudhuri et al., "Including Group-By in Query Optimization", Proceedings of the 20th VLDB Conference, Santiago, Chile, 1994, 13 pages.
Weipeng P. Yan et al., "Eager Aggregation and Lazy Aggregation", Proceedings of the 21st VLDB Conference, Zurich, Switzerland, 1995, 13 pages.
Andrew Witkowski et al., "Spreadsheets in RDBMS for OLAP", Proceedings of ACM SIGMOD, San Diego, U.S.A., 2003, 12 pages.
Rafi Ahmed et al., "Cost-Based Query Transformation in Oracle", Proceedings of teh 32nd VLDB Conference, Seoul, S. Korea, 2006, 11 pages.
Mostafa Elhemali et al., "Execution Strategies for SQL Subqueries", Proceedings of ACM SIGMON, Beijing, China, 2007, 12 pages.
Andrew Eisenberg et al., "SQL: 2003 Has Been Published", SIGMOD Record, Mar. 2004, 8 pages.

(Continued)

*Primary Examiner* — S Hasan
(74) *Attorney, Agent, or Firm* — Vista IP Law Group, LLP

(57) ABSTRACT

An improved approach is described for handling parallelization of window functions, particularly window functions that do not contain partition keys or which has low cardinality for the partition keys. The approach is highly scalable and can be used to greatly improve query processing. A two stage evaluation approach is employed to parallelize the processing of window functions. In the first stage, which is highly parallel, the majority of the computation of window function is done by all available processes. In this way, the entire computing power of the database server is utilized. The second stage, which is serial but is likely to be very short, all processes involved in first stage synchronize and complete the window function evaluation.

36 Claims, 21 Drawing Sheets

(56) References Cited

OTHER PUBLICATIONS

Fred Zemke et al., "Proposal for OLAP functions", U.S.A., Apr. 12, 1999, 60 pages.

"TPC Benchmark H (Decision Support)", Standard Specification Rev. 2.8, 1993, 149 pages url: http://tpc.org/tpch/spec/tpch2.8.0.pdf.

"TPC Benchmark DS", Standard Specification, Version 1.0.0d, Dec. 2007, 169 pages url: http://www.inf.uni-konstanz.de/fileadmin/dbis/DWOLAP/tpcds1.0.0.d.pdf.

Calisto Zuzarte et al., "WinMagic: Subquery Elimination Using Window Aggregation", Proceedings of ACM SIGMOD, San Diego, U.S.A., 2003, 5 pages.

* cited by examiner

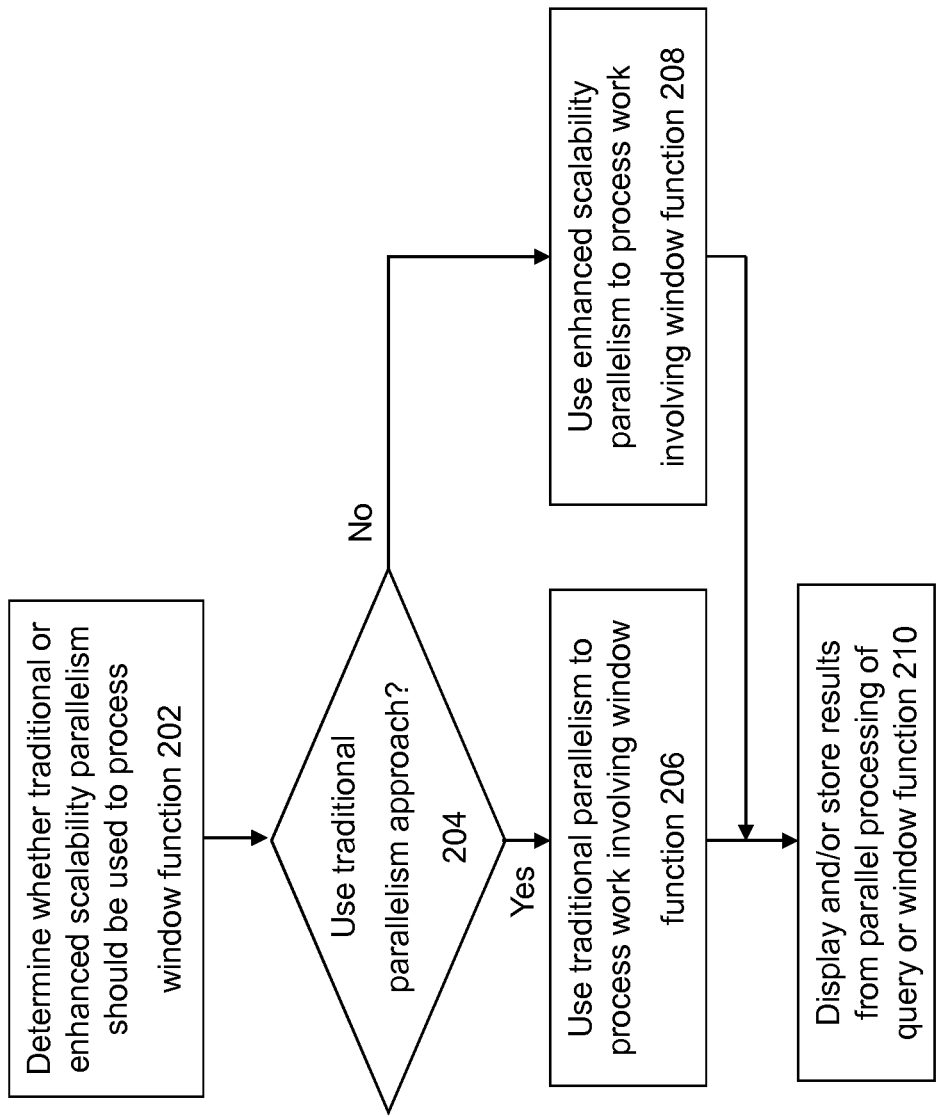

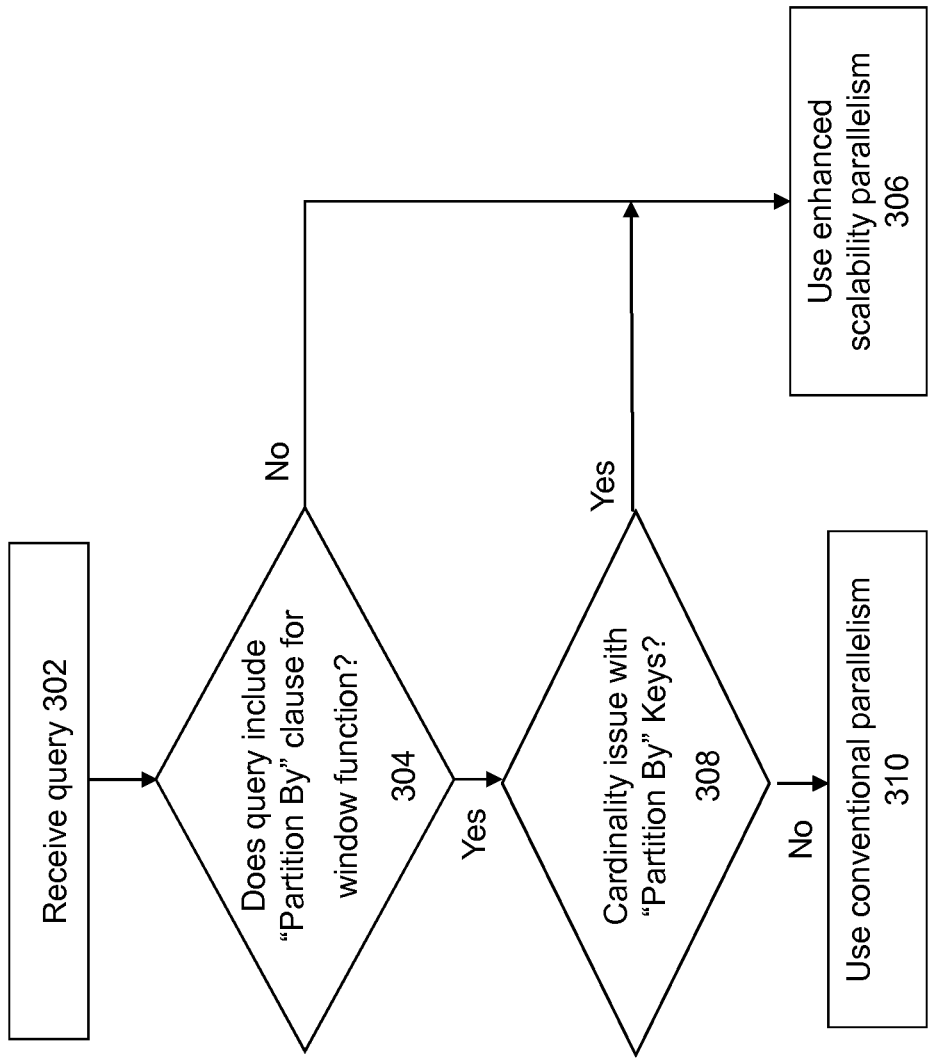

Figure 5A

Window Function 540

Sum (sales_amount) over ( ) from Sales_table

Sales_Table 542

| Sales Rep | Sales Amount |
|---|---|
| A | 100 |
| B | 150 |
| C | 200 |
| D | 150 |

532 — A
534 — B
536 — C
538 — D

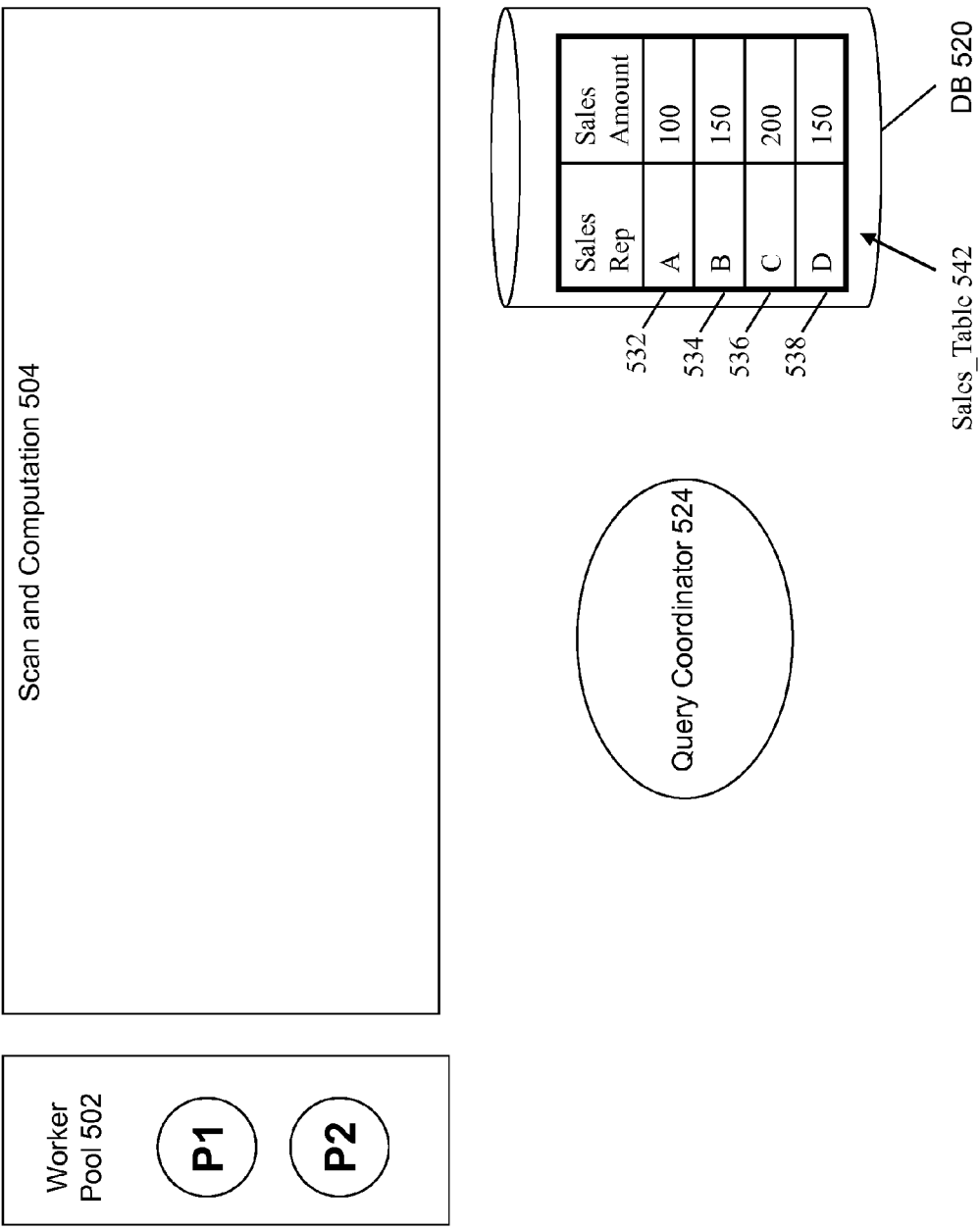

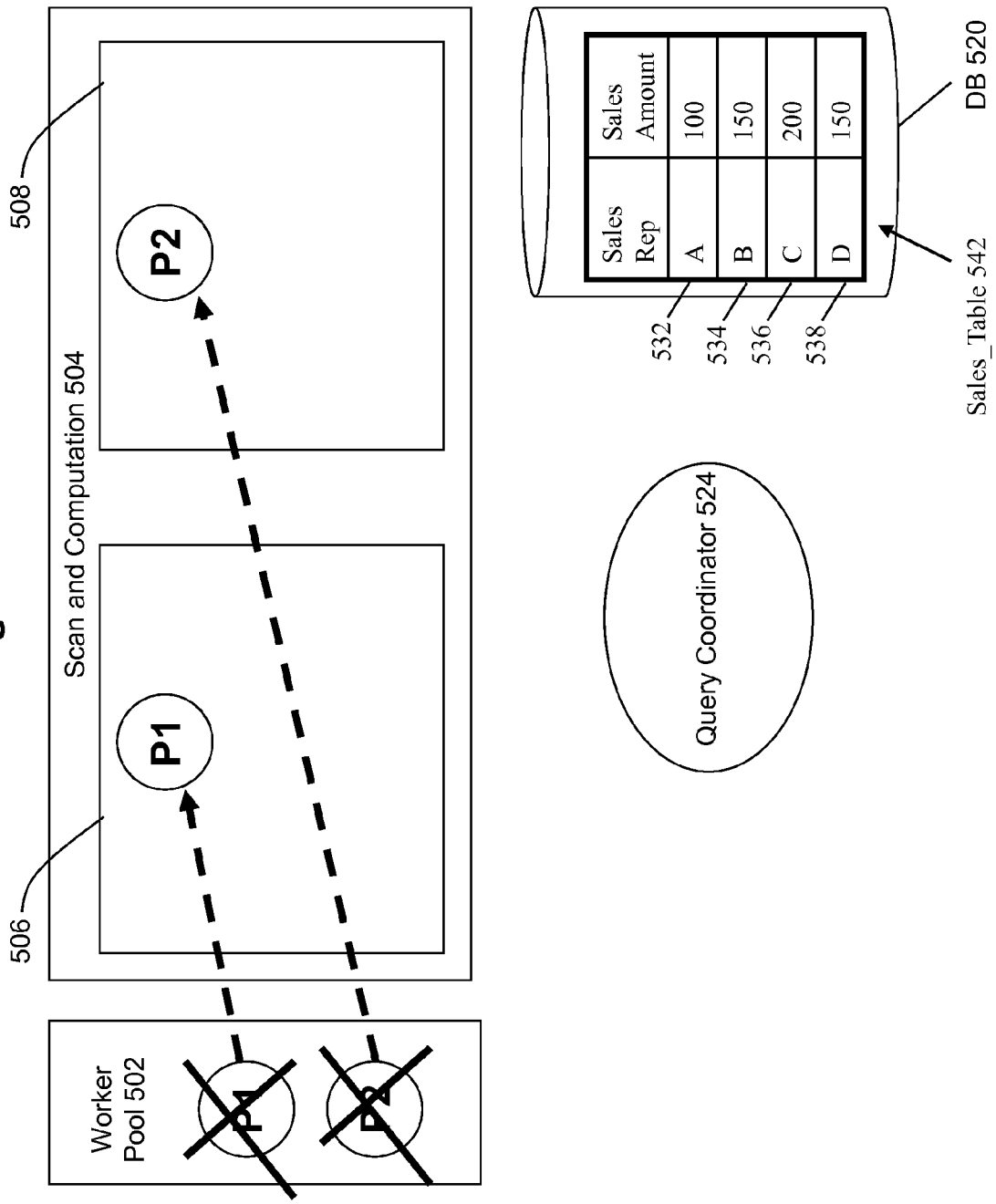

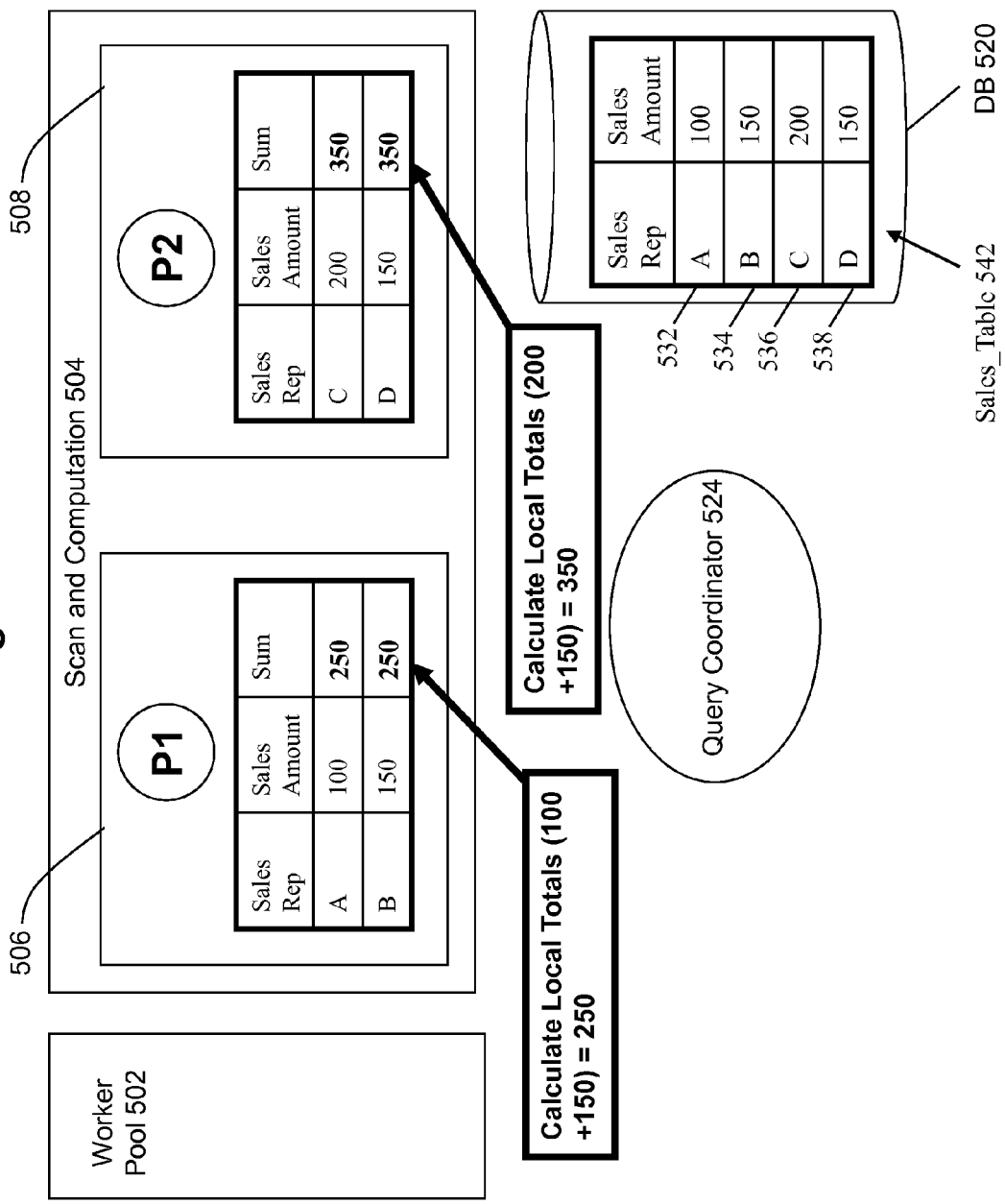

METHOD AND SYSTEM FOR ENHANCING SCALABILITY OF ANALYTIC WINDOW FUNCTIONS

FIELD

The invention relates to the field of data management and query processing.

BACKGROUND AND SUMMARY

Analytic "window functions" are very common SQL (structure query language) constructs used for data analysis. A window function is an aggregation function that is applied to a result set. The syntax of window functions looks like the following:

```
Window_Function( [arguments] ) OVER (
[PARTITION BY pk₁ [, pk₂, ...]]
[ORDER BY ok₁ [, ok₂, ...] [WINDOW clause]] )
```

Window functions are evaluated within partitions defined by the PARTITION BY (PBY) keys $pk_1$, $pk_2$, etc. with data ordered within each partition on ORDER BY (OBY) keys $ok_1$, $ok_2$, etc. The WINDOW clause defines the window (begin and end points) for each row. SQL aggregate functions (sum, min, count, etc.), (lag, lead, first_value, etc.) can be used as window functions. The PARTITION BY and ORDER BY clauses are optional, and it is possible for queries to include window functions that do not contain these clauses.

For example, the "sum( )" function is a commonly used window function that provides summing aggregation computations for a set of data. The following example statement:

sum(sales_amount) OVER(PARTITION BY sales_rep)

can be used to calculates the sum of the values in the "sales_amounts" column of all rows in a given table having the same "sales_rep" value. The "PARTITION BY" clause provides the key that is used to specify the sets of data for aggregation. The sum ( ) function is an example of a "reporting aggregation function", because the same value is reported for all rows in the partition, i.e., having the same "sales_rep" value for this particular query.

Given the large volume and quantities of data that may be need to be handled to process a window function, it is often desirable to parallelize the processing of such functions. The traditional way of parallelizing window functions is to use the PARTITION BY keys to split the work being handled by the parallelized processes or threads.

To explain, consider the example system 100 shown in FIG. 1A. This system 100 includes a pool 102 of worker processes that can be used to handle work in the system. The traditional processing approach is divided into two phases 110 and 112. The first phase 110 is the scanning phase, in which a set of worker processes (e.g., P1, P2, P3, and P4) are used to scan data for the window function in parallel from a database.

The second phase 112 is the window computation phase, in which the data scanned during the scan phase 110 is distributed among multiple worker processes to perform the actual computations required by the window function. The distribution of work among the worker processes in the window computation phase is based upon the number of different key values of the PARTITION BY clause. For example, assume that a window function is specified for the PARTITION BY clause is keyed upon the four financial quarters for a company, i.e., Q1, Q2, Q3, and Q4. Such as function may look like the following:

SUM (sales_amount) OVER(PARTITION BY sales_quarter)

In this example, it is clear that there can only be four different possible values for the PARTITION BY key. Therefore, the degree of parallelism that can be achieved for this window function in the window computation phase 112 is four, as shown in the example of FIG. 1A in which there are four different worker processes (i.e., P5, P6, P7, and P8) to handle the workload in this phase 112.

One possible drawback with this approach is that it will not parallelize window functions during the computation phase if the window function does not have a PARTITION BY clause. If the window function does not include a PARTITION BY clause, then in the traditional approach, there is no way for the workers in the scanning phase 110 to distribute work to multiple workers in the window computation phase 112. As shown in FIG. 1B, what ends up happening is that the work in the window computation phase 112 is assigned to only a single worker process P5, even if there are multiple other worker processes P6, P7, and P8 that are waiting in the pool 102 and are available to be used to handle computation workloads.

Another possible drawback is that this approach will not have scalable execution for window functions with low-cardinality partition keys, particularly if the number of available worker processes far exceeds the number of PARTITION BY keys. For example, consider the following window function:

SUM (sales_amount) OVER(PARTITION BY gender)

This window function has a PARTITION BY clause where the partition keys can only have two values, either "male" or "female." Therefore, as shown in FIG. 1C, this the window computation phase 112 can only have two worker processes (i.e., P5 and P6) assigned to handle the computation workload, even though there may be multiple other worker processes (i.e., P7 and P8) that are waiting in the pool 102 and are available to be used to handle computation workloads.

Therefore, there is a need for an improved approach to provide more scalable handling of window functions, since conventional approaches to handling such functions are not intrinsically parallelizable if there are no partition keys, and that parallel evaluation of low-cardinality window functions is limited by the number of distinct partition key values.

According to some embodiments, the invention uses a two stage evaluation approach to parallelize the processing of window functions. In the first stage, which is highly parallel, the majority of the computation of window function is done by the available processes. In this way, the entire computing power of the database server is utilized. The second stage, which is serial but is likely to be very short, all processes involved in first stage synchronize and complete the window function evaluation.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

FIG. 2 shows a flow of an improved approach for parallel processing of a window function according to some embodiments of the invention.

FIG. 3 shows a flow of an approach for determining whether to use a traditional parallel processing approach or to use the inventive parallel processing approach of the present invention.

FIGS. 5A-J illustrate the approach of FIG. 4.

DETAILED DESCRIPTION

The invention is directed to an improved approach for implementing parallel processing of window functions. The workload for the parallel processing may be performed by any suitable processing entity. A non-limiting list of examples of such processing entities includes processes, threads, tasks, processors, nodes and CPUs. For the purposes of illustration, the present description will employ the term "process" or "worker process" to collectively refer to such processing entities. It is noted, however, that the present invention may be applied to parallelization using any parallel or distributed processing approach, and is not limited to any specific processing entity illustrated in the example embodiments.

According to some embodiments, the invention uses a two stage evaluation approach to parallelize the processing of window functions. In the first stage, which is highly parallel, the majority of the computation of window function is done by available processes. In this way, the entire computing power of the database server is utilized. The second stage, which is serial but is likely to be very short, processes involved in first stage synchronize and complete the window function evaluation.

Consider for example a window function without partition keys such as "sum(sales) over ( )". Prior to embodiments of the invention, computation of this function would be serial and performed by only a single process. With the present invention, many processes in database server can participate in the computation evaluation of the function.

FIG. 2 is a high level flowchart of a process for implementing parallel processing of window functions. At 202, a determination is made as to whether the window function should be processed using the traditional parallelism approach or whether the present inventive approach for enhanced scalability parallelism should be used. The details of how to make this determination according to some embodiments is described below in conjunction with the description of FIG. 3.

Figure 1A:
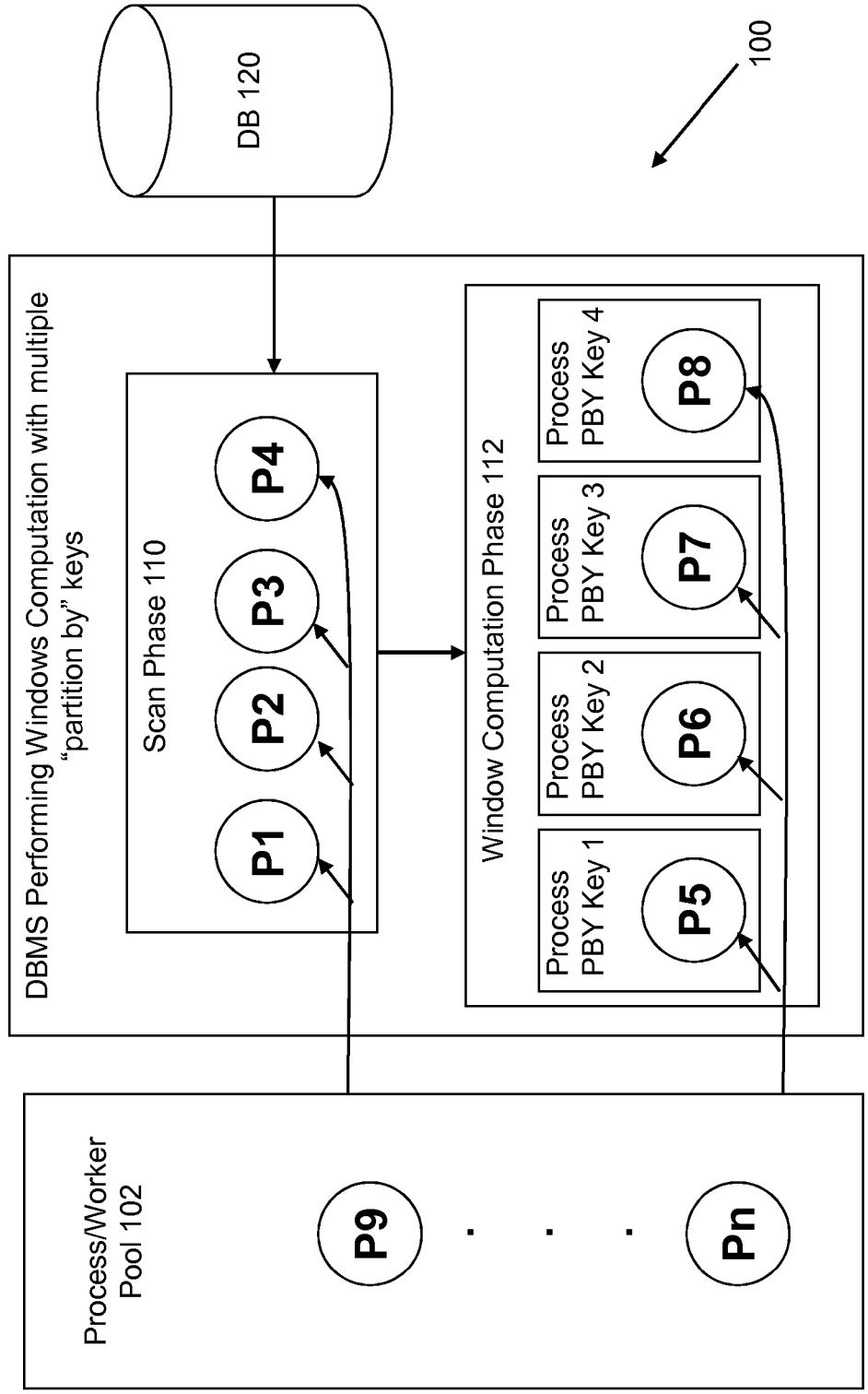
FIGS. 1A-C illustrates example approaches to parallelize processing of a window function.
Figure 1B:
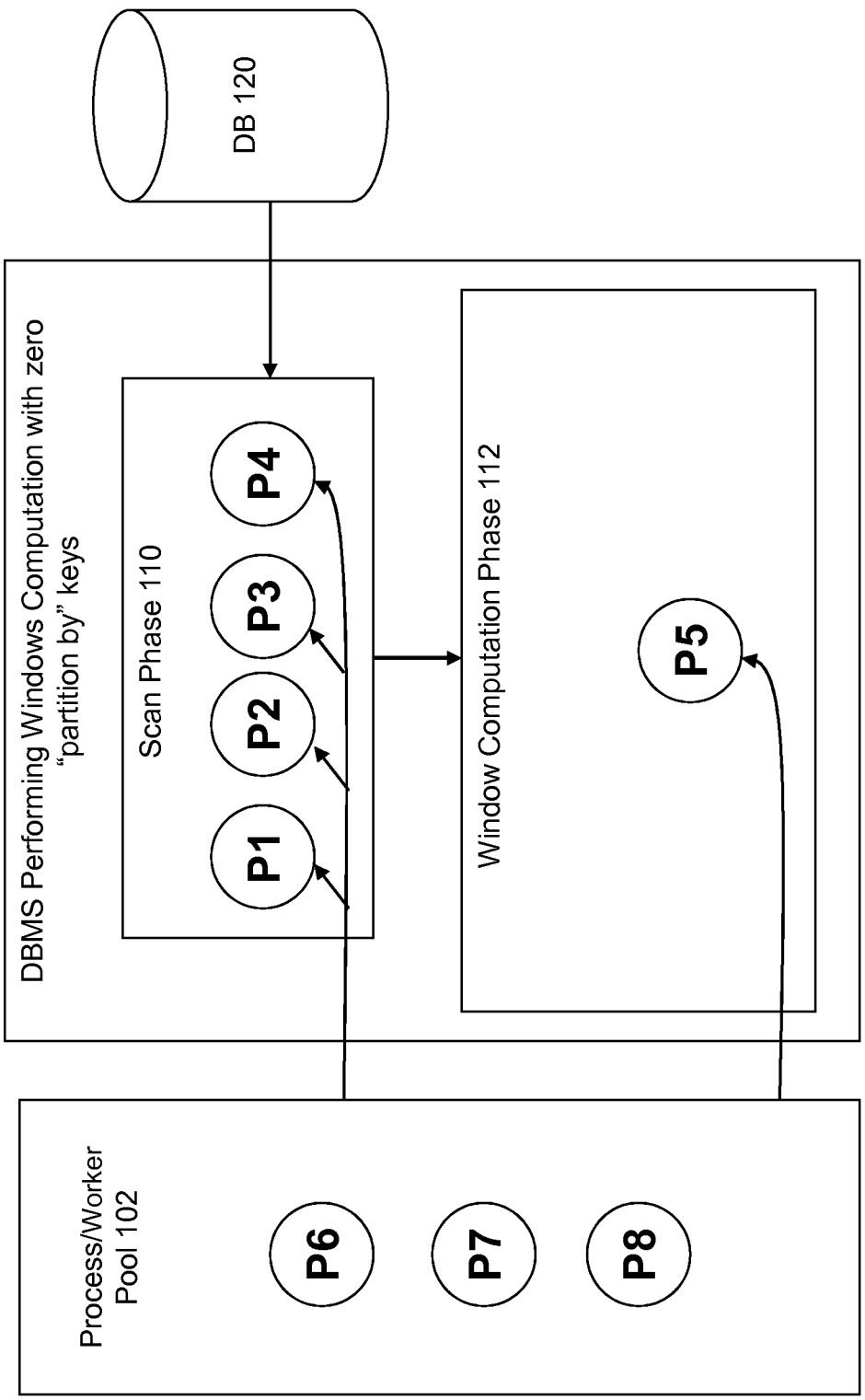
Figure 1C:
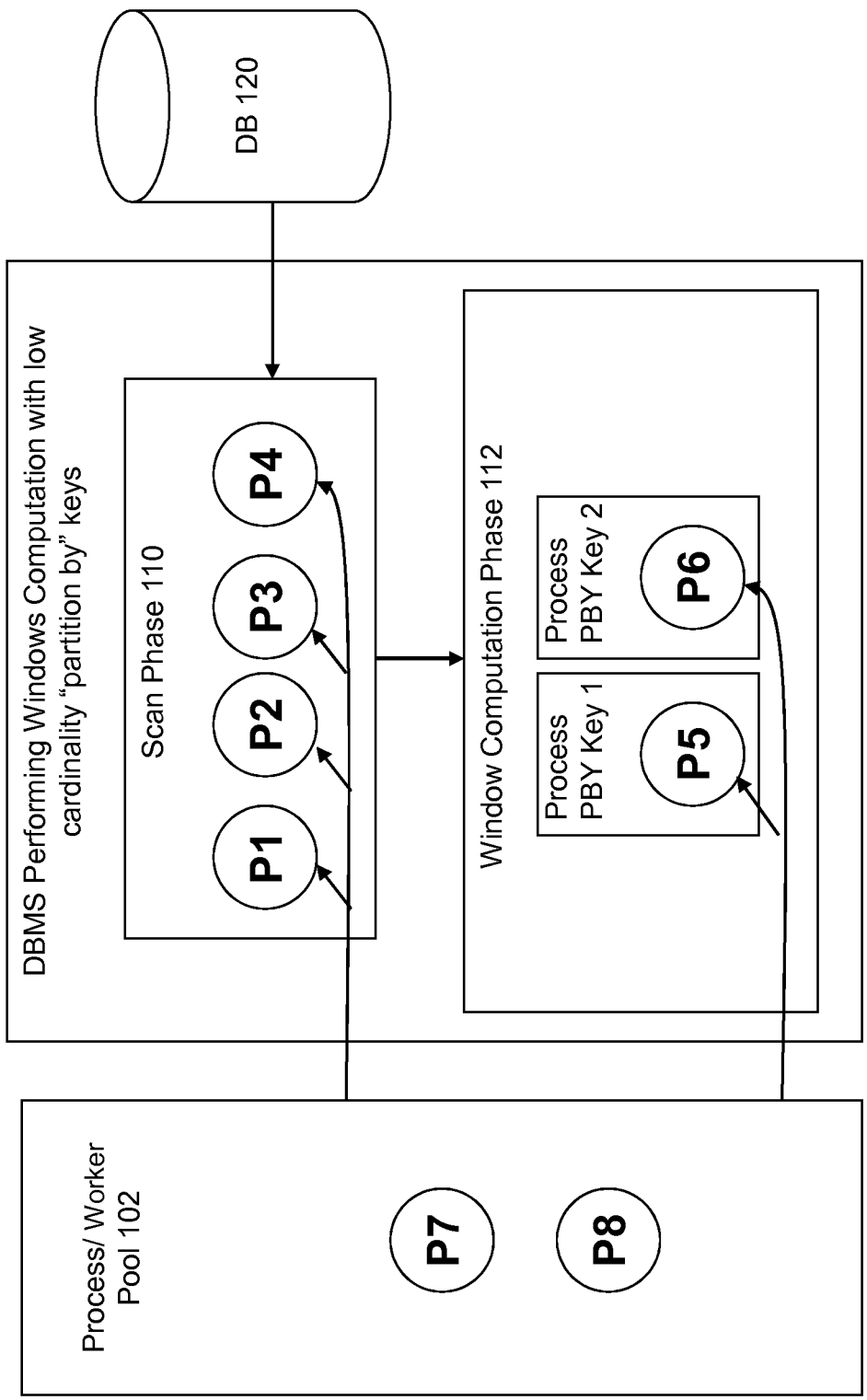

If the determination was made to use the traditional approach then, at 206, the traditional parallelism as described in FIG. 1A is used to process the window function. On the other hand, if the decision was made to use the inventive approach, then at 208, the inventive approach is utilized to push the computation work to the scanning worker processes, as described in more detail below.

At 210, the processing results are displayed to the ser on a display device or are stored in a computer readable storage medium.

FIG. 3 shows an approach for determining whether a window function should be processed using the traditional parallelism approach or whether the present inventive approach for enhanced scalability parallelism should be used. At 302, a query having a window function is received for processing. The window function is analyzed at 304 to determine whether the window function includes a PARTITION BY clause. If not, then at 306, the decision is made to use the inventive enhanced scalability parallelism to process the window function.

If the window function includes a PARTITION BY clause, then a further inquiry is made at 308 whether the cardinality of the partition key meets a threshold level such that the traditional parallelism should be used. One approach that can be taken to make this decision is to make a comparative analysis based upon both the number of available worker processes and the cardinality of the partition key. In this approach, if the number of available worker processes far exceeds the cardinality of the partition key, then the inventive parallelism approach should be used. For example, if there are over 100 available worker processes, but the number of partition key values is two (e.g., because the PARTITION BY clause is keyed upon a "gender" value), then the number of available worker processes far exceeds the cardinality of the partition key and the inventive parallelism approach will be used.

Alternatively, the determination of 308 can be made solely upon check of whether the partition key meets a cardinality threshold, without requiring a comparison to the number of available worker processes. If the cardinality of the partition key exceeds the threshold, then the conventional parallelism approach is used at 310 to process the window function. On the other hand, if the cardinality of the partition key is beneath the threshold value, then the parallelism approach of the present invention is applied at 306 to process the window function. In yet another embodiment, a threshold cardinality requirement can be used in conjunction with a comparison of available worker processes to make the determination of 308.

Figure 4:
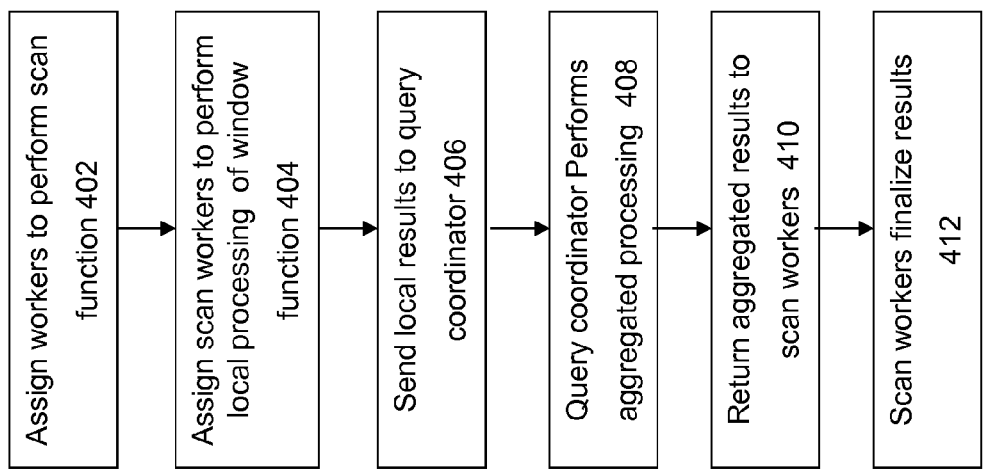
FIG. 4 shows a flow of an improved approach for handling a window function according to some embodiments of the invention.

FIG. 4 shows the flow of the inventive scalable approach for parallel processing of a window function according to an embodiment of the invention. The approach of FIG. 4 is particularly useful to handle window functions that do not have a PARTITION BY clause. At 402 of FIG. 4, worker processes are assigned to perform scanning functionality. Each worker process, at 404, scans a disjoint portion of the input similar to the scanning function performed in the traditional parallelism approach.

In the present embodiment, the computation processing is quite different from the traditional approach, since the computation processing is pushed-down to these worker processes as well, so that these scanning-stage worker processes are also responsible for computing the window function for its assigned portion of the data set to generate a local result set. For example, for the Sum( ) function, each worker process would compute the sum of the specified row values on its portion of the input data set.

After computing the local computation result, then at 406, each worker process would communicate the local computation result to a coordinating process, which is referred to herein as a "query coordinator." The query coordinator would receive the local results from the worker processes, and at 408, performs aggregation computations upon the local results to product aggregated results. For the example Sum( )

function, the query coordinator computes the total of local sums it received from worker processes to generate the aggregated sum value.

At 410, the query coordinator sends the aggregated result back to the worker processes, thereby allowing the worker processes at 412 to use the aggregated results to finalize the computations and to generate the final result set.

Figure 5D:
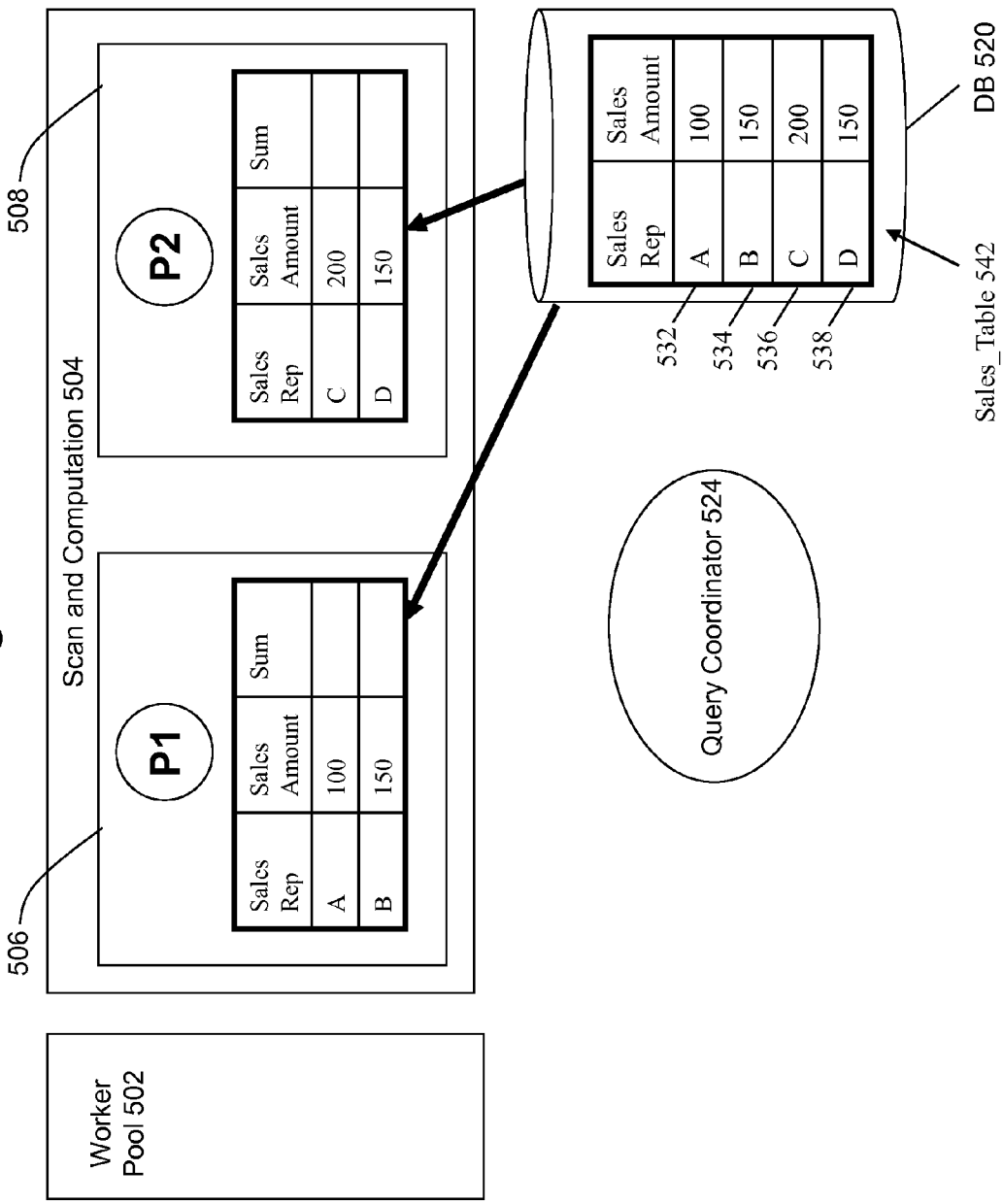

FIGS. 5A-J provide an illustrated example of how this approach can be used to process a window function in parallel. FIG. 5A shows an example window function 540 as follows:

Sum (sales_amount) over ( ) from Sales_Table

This window function essentially computes the total sum of the values in the "Sales_amount" column from the table identified as "Sale_Table".

It can be seen that this window function does not have a PARTITION BY clause. Therefore, according to the flow described in FIG. 3, this window function will be processed using the inventive approach of FIG. 4.

Sales_Table 542 is shown in FIG. 5A having four rows of data. Row 532 has the value "A" in the Sales_Rep column and a value "100" in the Sales_Amount column. Row 534 has the value "B" in the Sales_Rep column and a value "150" in the Sales_Amount column. Row 536 has the value "C" in the Sales_Rep column and a value "200" in the Sales_Amount column. Row 538 has the value "D" in the Sales_Rep column and a value "150" in the Sales_Amount column.

FIG. 5B shows the system of the present invention having a worker pool 502 with two worker processes P1 and P2 in pool 502 that are available to perform work for the window function. The work performed by worker processes P1 and P2 correspond to processing performed by one or more hardware-based processors in a computing system. The disclosed system also includes a query coordinator 524, which may be implemented using a worker process from the pool 502. Those of skill in this field of technology will realize that, to facilitate an explanation of the invention, the present example is being described with a very small number of worker processes. It is noted that the exact number of worker processes used in the example should not be taken as an exemplary number for determining the scope of the invention.

Scan and computation activities are performed at 504, where the scan obtains rows of data (i.e., rows 532, 534, 536, and 538) from Sales_Table 542 that is stored in database 520. The database 520 may be implemented with any suitable type of computer readable medium or storage devices that is constructed or configured to hold data. The database may be located on a computer readable storage device that comprises any combination of hardware and software that allows for ready access to the data in database 520.

Turning to FIG. 5C, this figure shows worker processes being assigned to perform scanning to process the window function in parallel. In particular, worker processes P1 and P2 are both assigned to process the window function in parallel. Worker process P1 is associated with work resources 506 and worker process P2 is associated with work resources 508. Such work resources include, for example, memory or context resources that would conventionally be used or held by threads/processes to perform work in a computing system.

FIG. 5D illustrates the scan process being performed by worker processes P1 and P2, in which each worker process scans a set of data from the database 520. The set of rows being scanned by each worker process may be a disjoint set of rows. In this example, worker process P1 scans rows 532 and 534 while worker process P2 scans rows 536 and 538.

Next, each worker process will perform processing on its corresponding set of rows to calculate a local result for the window function. In the present example, since the Sum( ) function is being processed, each worker process will compute a local result by summing the relevant column values for its own set of scanned data.

As shown in FIG. 5E, the local total result computed by worker process P1 is "250", since this value is the sum of the values in the "Sales_Amount" column (100 and 150) for the rows 532 and 534, respectively, that were scanned by worker process P1. The local total result computed by worker process P2 is "350", since this value is the sum of the values in the "Sales_Amount" column (200 and 150) for the rows 536 and 538, respectively, that were scanned by worker process P2.

Figure 5F:
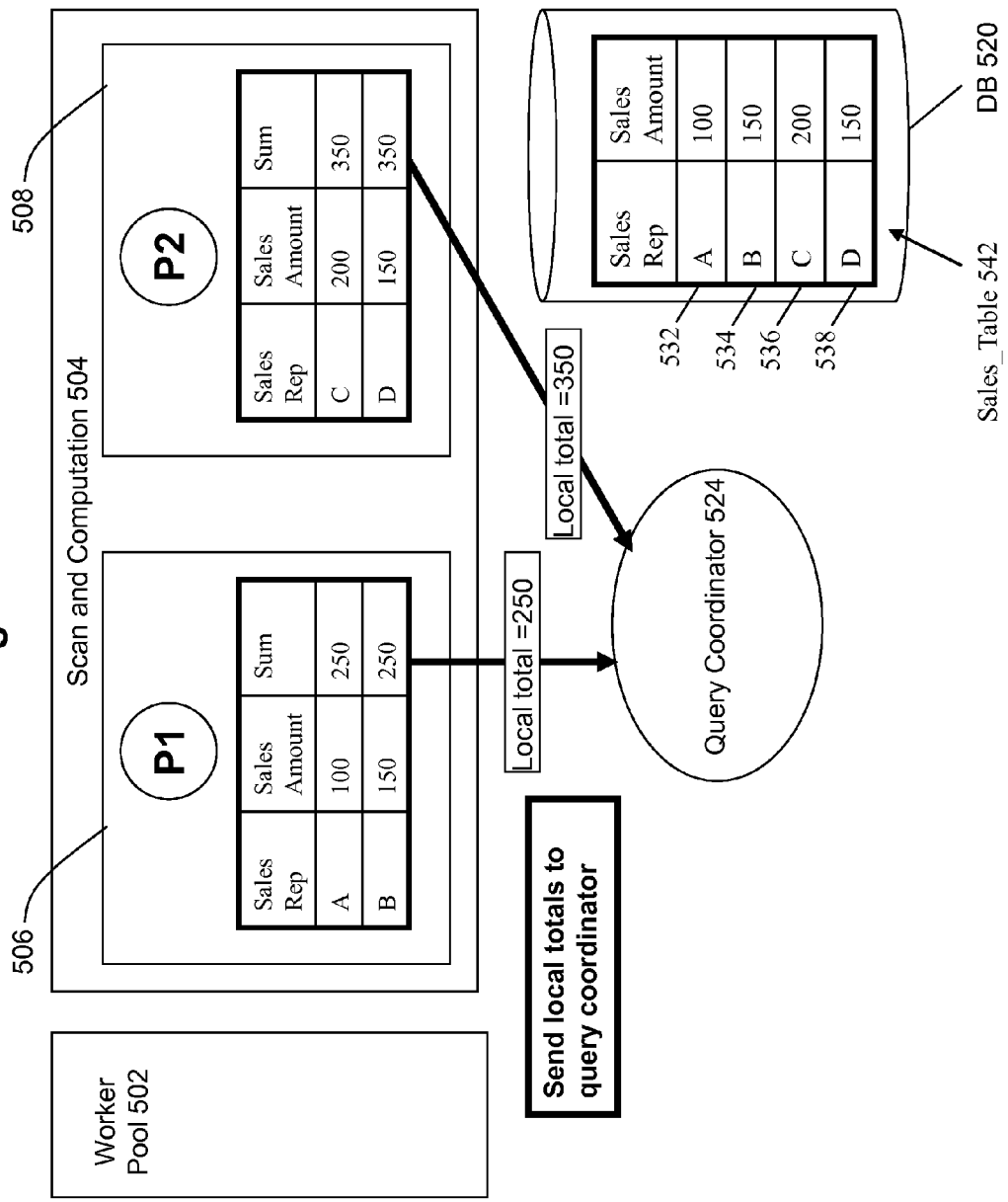

The next action is to send the local results from the worker processes to the query coordinator. In the present example, as shown in FIG. 5F, worker process P1 will send its local result value of "250" to the query coordinator 524. Similarly, worker process P2 will send its local result value of "350" to the query coordinator 524.

Figure 5G:
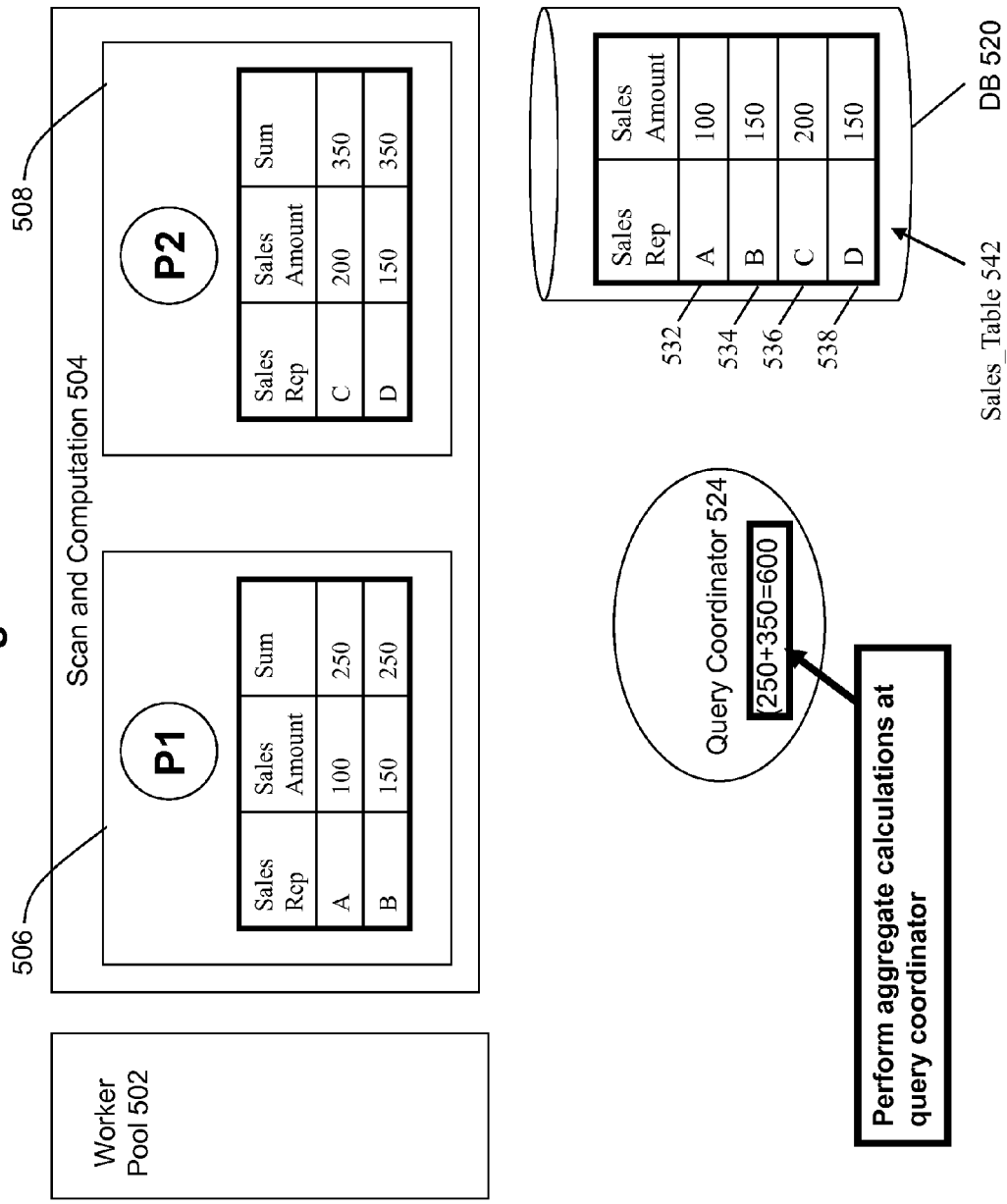

The query coordinator 524 will then perform aggregation computations upon the local results that have been sent to the query coordinator 524. In the present example, the window function is Sum( ) therefore the aggregation calculation is to compute the sum of the local results values that have been sent to the query coordinator 524. As shown in FIG. 5G, the aggregation calculation performed by the query coordinator 524 will generate an aggregated result of "600" based on the summing of the local results 250 and 350.

Figure 5H:
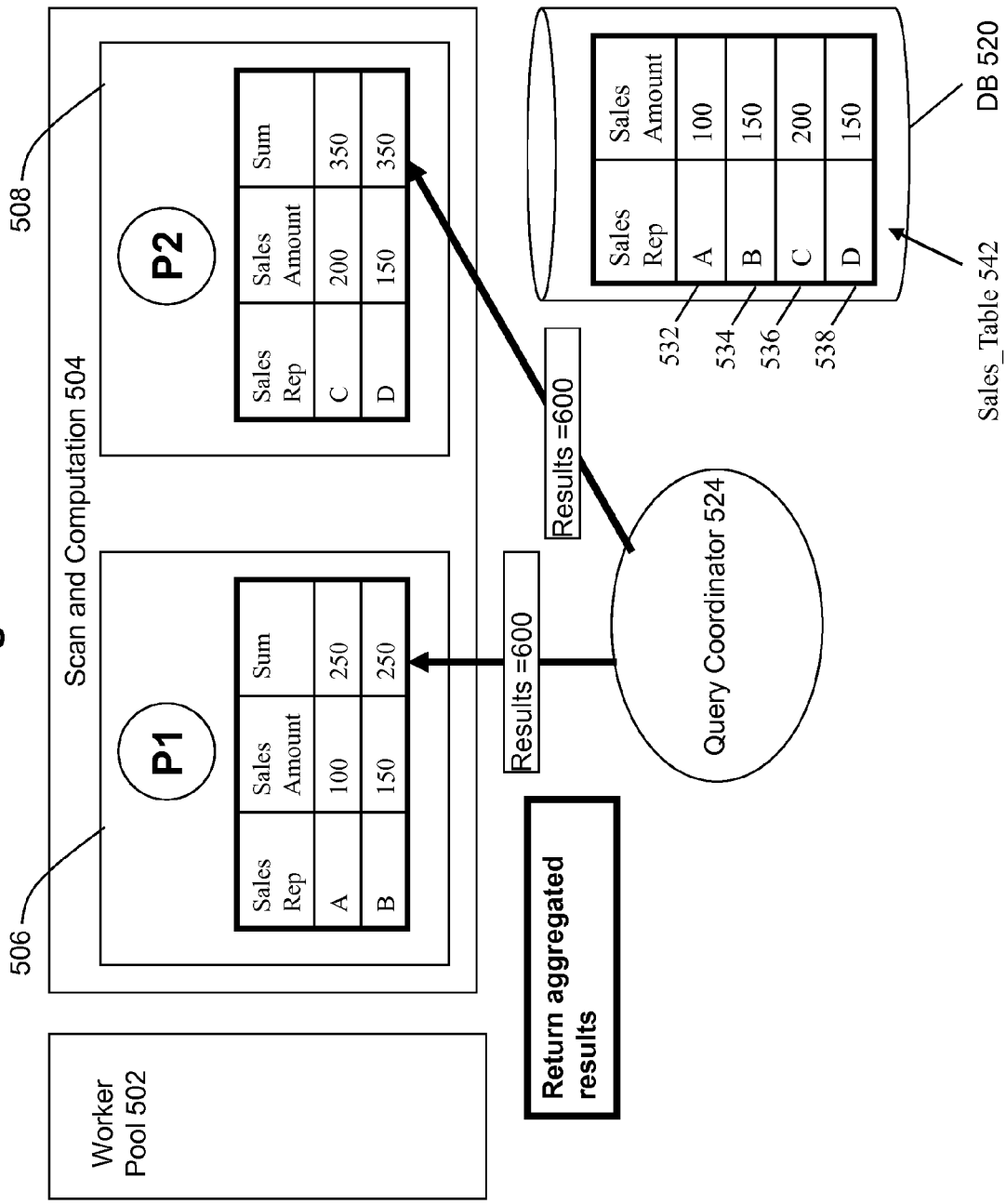
Figure 5I:
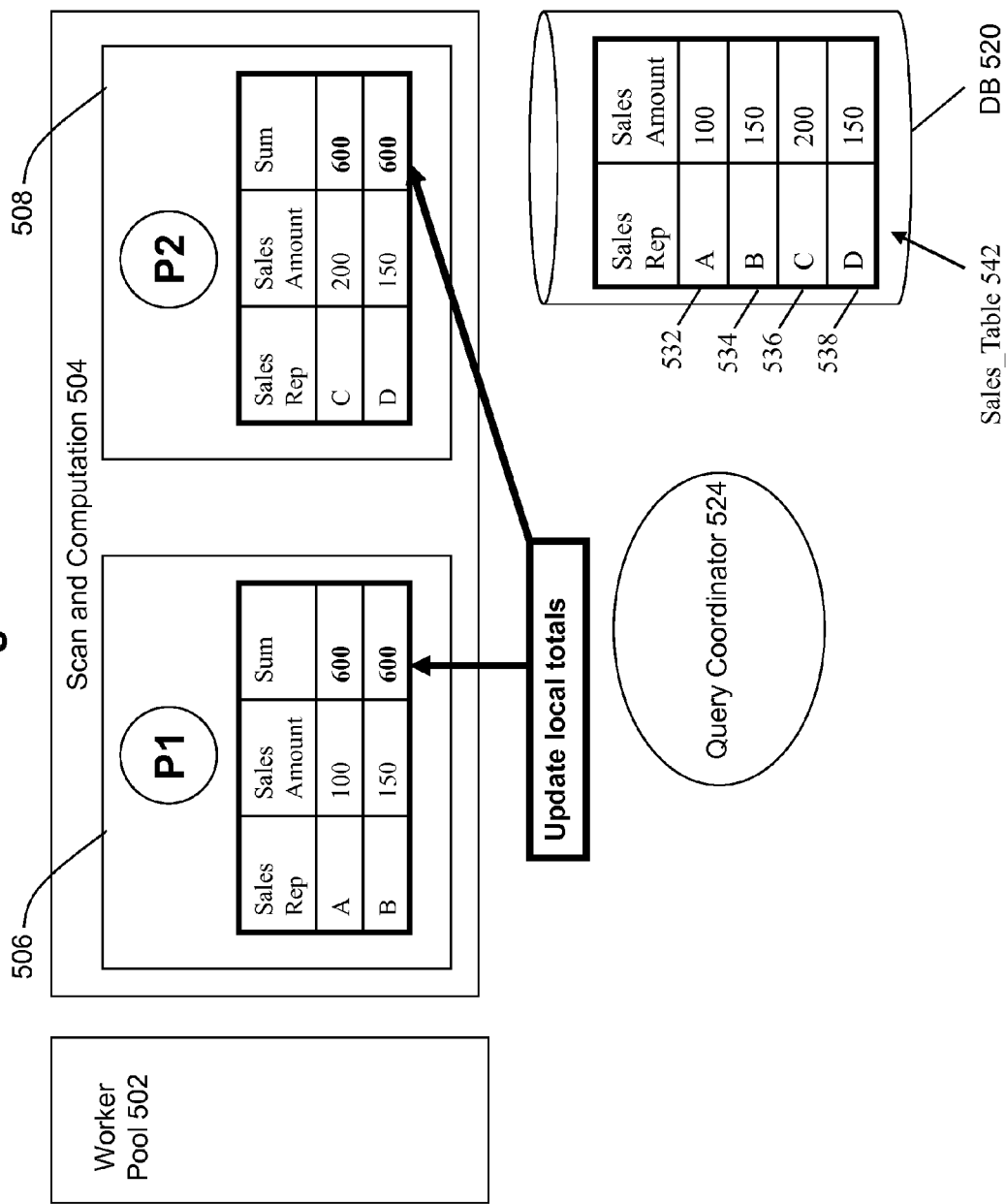

Next, as shown in FIG. 5H, the aggregated results are returned from the query coordinator 524 to the worker processes P1 and P2. In one embodiment, the aggregated results are used to update the local set of data being worked upon by each of the worker processes P1 and P2, as shown in FIG. 5I. In an alternate embodiment, the local results are not actually changed at this point, but the worker processes ensure that the correct aggregated results are used for computation or transmitted to a recipient as appropriate.

Figure 5J:
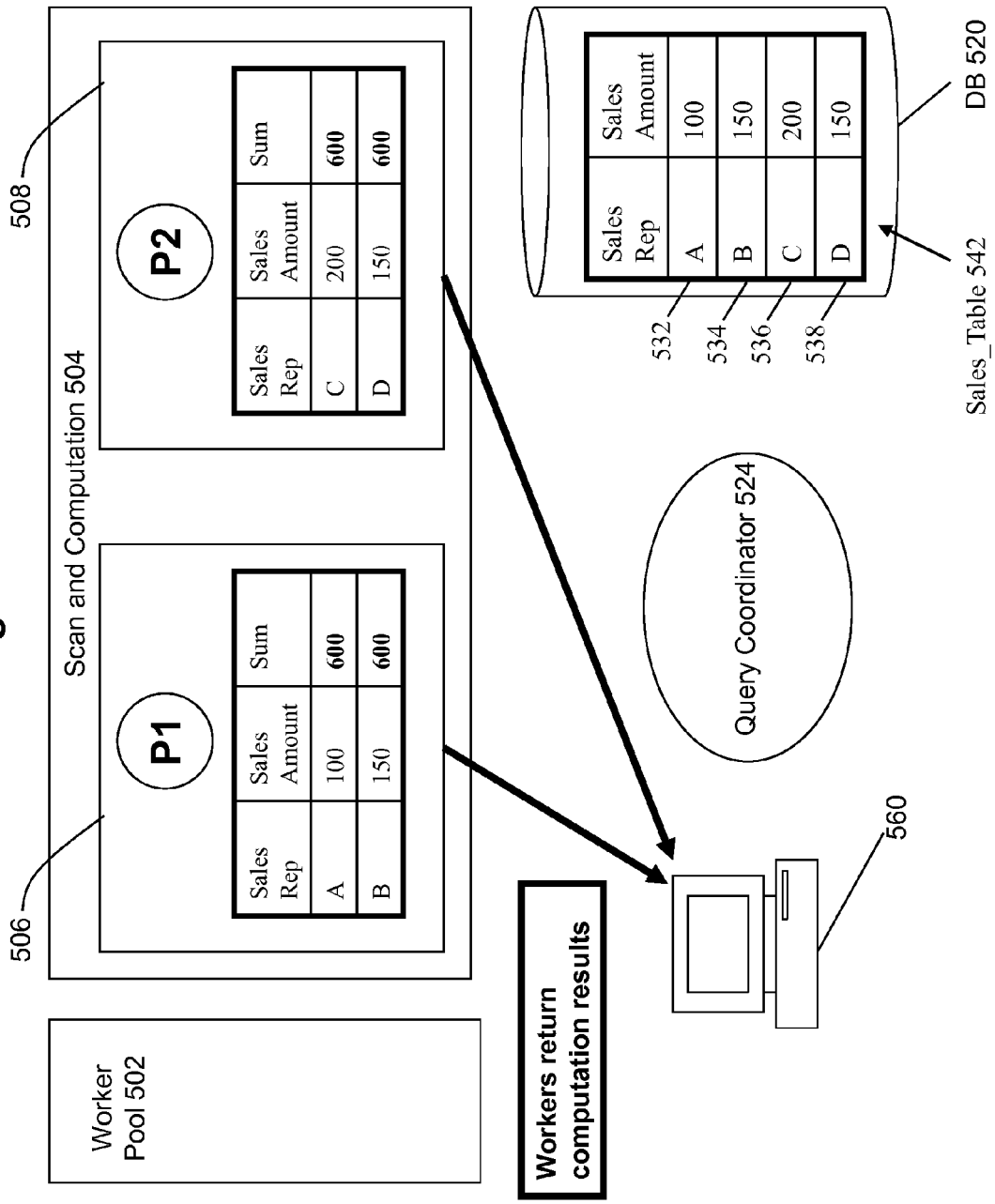

The worker processes P1 and P2 can now finalize the computations that need to be performed to process any queries that rely upon the window functions, since the overall aggregated value for the window function is now known by each of the worker processes. As shown in FIG. 5J, the final computation results can now be displayed to the user at a user station 560 or stored in a computer readable medium.

The user station 560 comprises any type of computing station that may be used to access, operate, or interface with the computing system, whether directly or remotely over a network. Examples of such user stations 560 include workstations, personal computers, or remote computing terminals. User station 560 comprises a display device, such as a display monitor, for displaying processing results or data to users at the user station 560. User station 560 also comprises input devices for a user to provide operational control over the activities of some or all of the disclosed system.

Therefore, what has been described is an improved approach for parallelizing the processing of a window function. It is noted that in the above example, the window function did not include a PARTITION BY clause, and therefore had zero partition keys. Yet, the present invention can be used to divide the workload for handling the window function across multiple parallel worker entities. This provides greatly improved scalability for processing such window functions.

Figure 6:
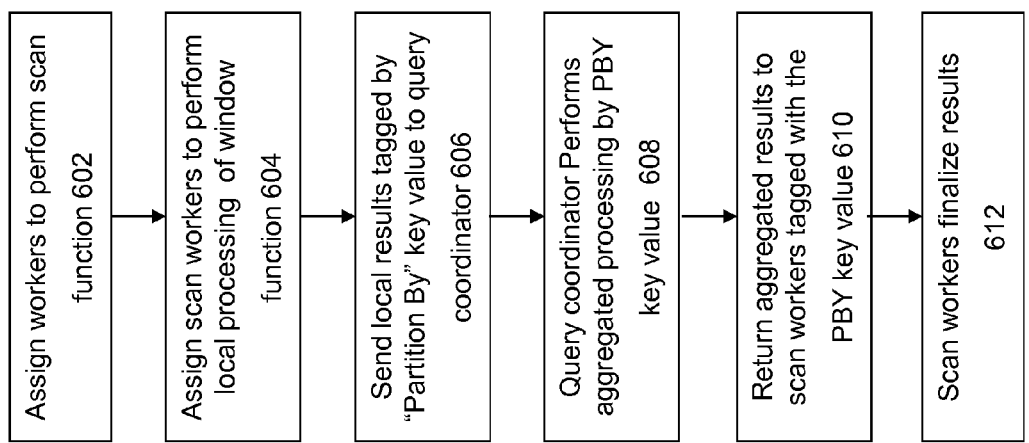
FIG. 6 shows a flow of an improved approach for handling a window function according to some embodiments of the invention.

FIG. 6 shows the flow of an alternative approach for parallel processing of a window function according to an embodiment of the invention. The approach of FIG. 6 is particularly useful to handle a window function that does have a PARTITION BY clause, but where the cardinality of the partition key is below a required threshold. At 602 of FIG.

6, worker processes are assigned to perform scanning functionality. Each worker process, at 604, scans a disjoint portion of the input similar to the scanning function performed in the traditional parallelism approach.

Like the approach of FIG. 4, the approach of FIG. 6 will cause the computation processing to be pushed-down to the scan worker processes as well, so that these scanning-stage worker processes are responsible for computing the window function for its assigned portion of the data set to generate a local result set.

However, unlike the approach of FIG. 4 that just sends a local result to the query coordinator, the approach of FIG. 6 will cause the local result to be sent to the query coordinator where the local result is tagged with the specific partition key value for that local result value. Therefore, at 606, each worker process would communicate the local computation result tagged with the relevant partition key value to the query coordinator.

The query coordinator receive the local results tagged with the partition key value from the worker processes, and at 608, performs aggregation computations upon the local results to product aggregated results. In the case of FIG. 6, the aggregation computations will be performed to aggregate local results separately for the different partition key values.

At 610, the query coordinator sends the aggregated results back to the worker processes, where the aggregated results are also tagged with the relevant partition key values. This allows the worker processes at 612 to use the aggregated results to finalize the computations and to generate the final result set. In some embodiments, the local window computation results are sorted on the partition key values. This provides for more efficient processing, since scanning of the ordered data more easily allows one to identify the correct aggregated results to be produced.

Figure 7:
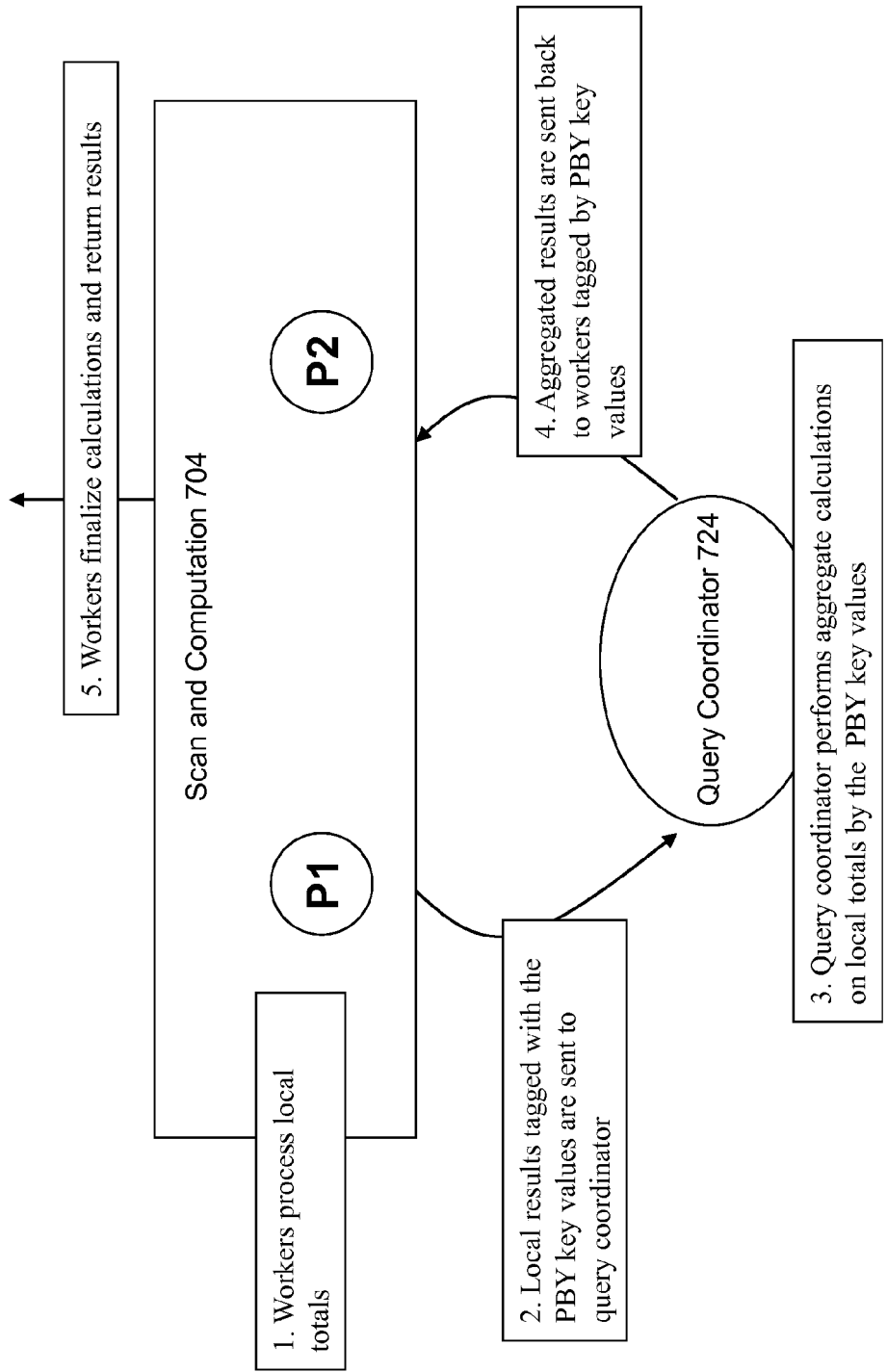
FIG. 7 illustrates the approach of FIG. 6.

FIG. 7 illustrates this sequence of activities in a computing system for handling a window function that does have a PARTITION BY clause, but which still needs to use the inventive parallelization approach because of cardinality problems with the partition key. As noted at (1), the worker processes P1 and P2 in the combined scan and computation stage 704 will scan the relevant rows from the database, and will process their respective rows to generate local result totals. At (2), the local computation results are tagged with the relevant partition key values and are sent to the query coordinator 724.

Next, at (3), the query coordinator 724 performs aggregate computations upon the local totals, where the aggregation computations are performed in consideration of the partition key values. At (4), the aggregated results are sent to the worker processes P1 and P2, where the aggregated results are also tagged with the relevant partition key values. Thereafter, the worker processes P1 and P2 will use the aggregated results to perform any needed final calculation to generate final results. At (5), the final results are sent for display on a display device or sent for storage in a computer readable storage medium.

Figure 8:
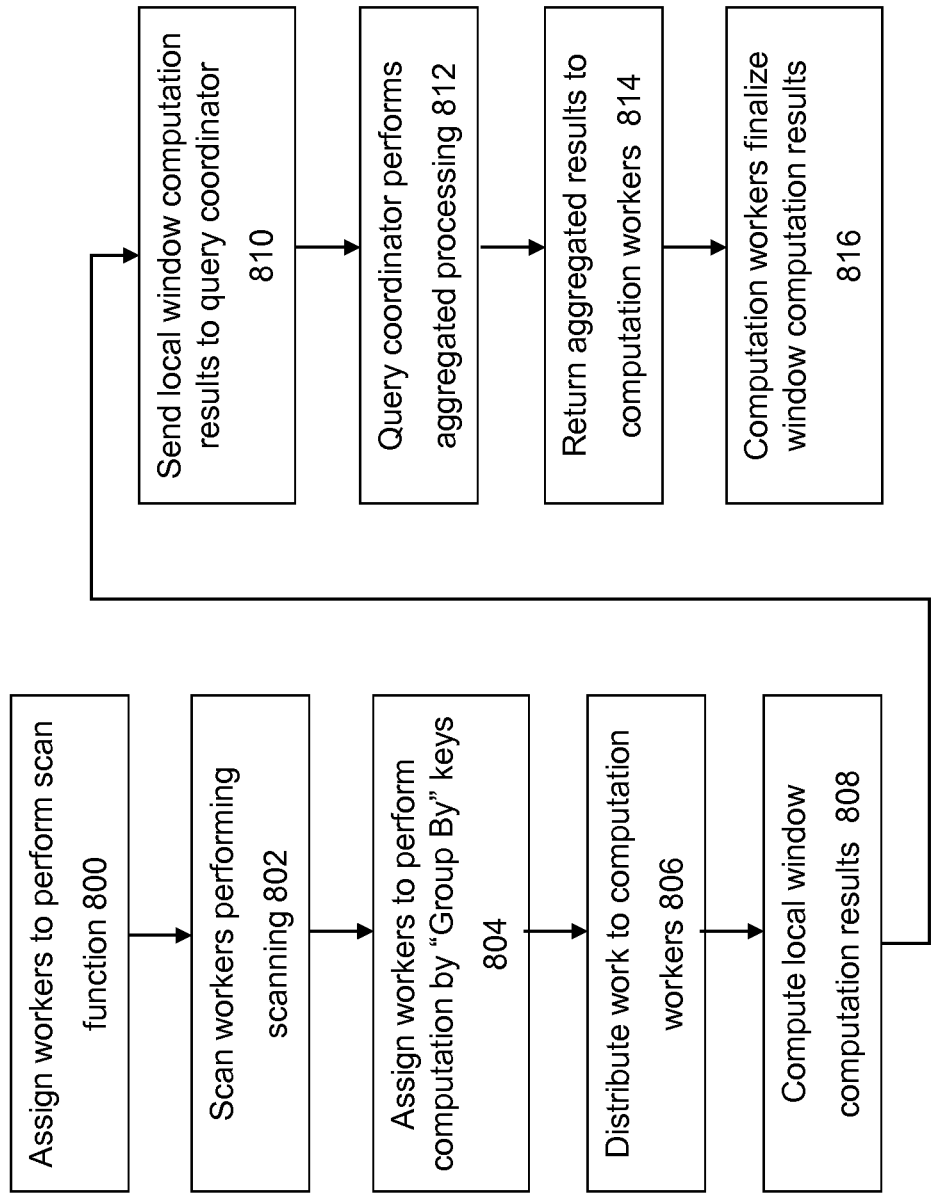
FIG. 8 shows a flow of an improved approach for handling a window function according to some embodiments of the invention.

FIG. 8 shows the flow of another approach for parallel processing of a window function according to an embodiment of the invention, where the approach of FIG. 8 takes into account special processing that may need to occur to handle the existence of a GROUP BY clause in the query. The following is an example query that includes both a window function and a GROUP BY clause:

Select sales_rep, sales_amount, sum(sales_amount) over ( )
from (select sales_rep, sum(sales_amount) sales_amount
from sales_table group by sales_rep);

Assume that this query is directed to the table shown in FIG. 5A. The "from" clause in this query computes the sales for the sales_rep, where the results are grouped by the "sales_rep" values. The outer query is computing the grand totals for the sales values.

The present approach of FIG. 8 to address this type of query differs from prior approaches in that computation for the window function will be performed by a set of computation workers that may be distinct from the scan workers. Rows scanned by the scan workers will be distributed to the computation workers to be processed in parallel, where the work distribution to the computation workers is based upon the GROUP BY keys.

At 800 of FIG. 8, worker processes are assigned to perform scanning functionality. Each scan worker process, at 802, scans a portion of the input from the designated table(s) in the database.

At 804, based upon the GROUP BY key(s) in the query, the scan workers will assign rows to a set of computation worker processes. These computation workers will, at 808, compute the GROUP BY and window function results for its assigned portion of the data set to generate a local windows computation result set. Hashing is one approach that can be taken to perform the GROUP BY calculations. In some embodiment, assignment of work is performed in a manner that causes the workload to be balanced across the computation workers.

At 810, the local windows computation results are sent to the query coordinator. The query coordinator receives the local windows computation results from the computation worker processes, and at 812, performs aggregation computations upon the local window computation results to product aggregated results. At 814, the query coordinator sends the aggregated results back to the computation worker processes. The computation worker processes, at 816, will use the aggregated results to finalize the window function computations and to generate the final result set.

Figure 9:
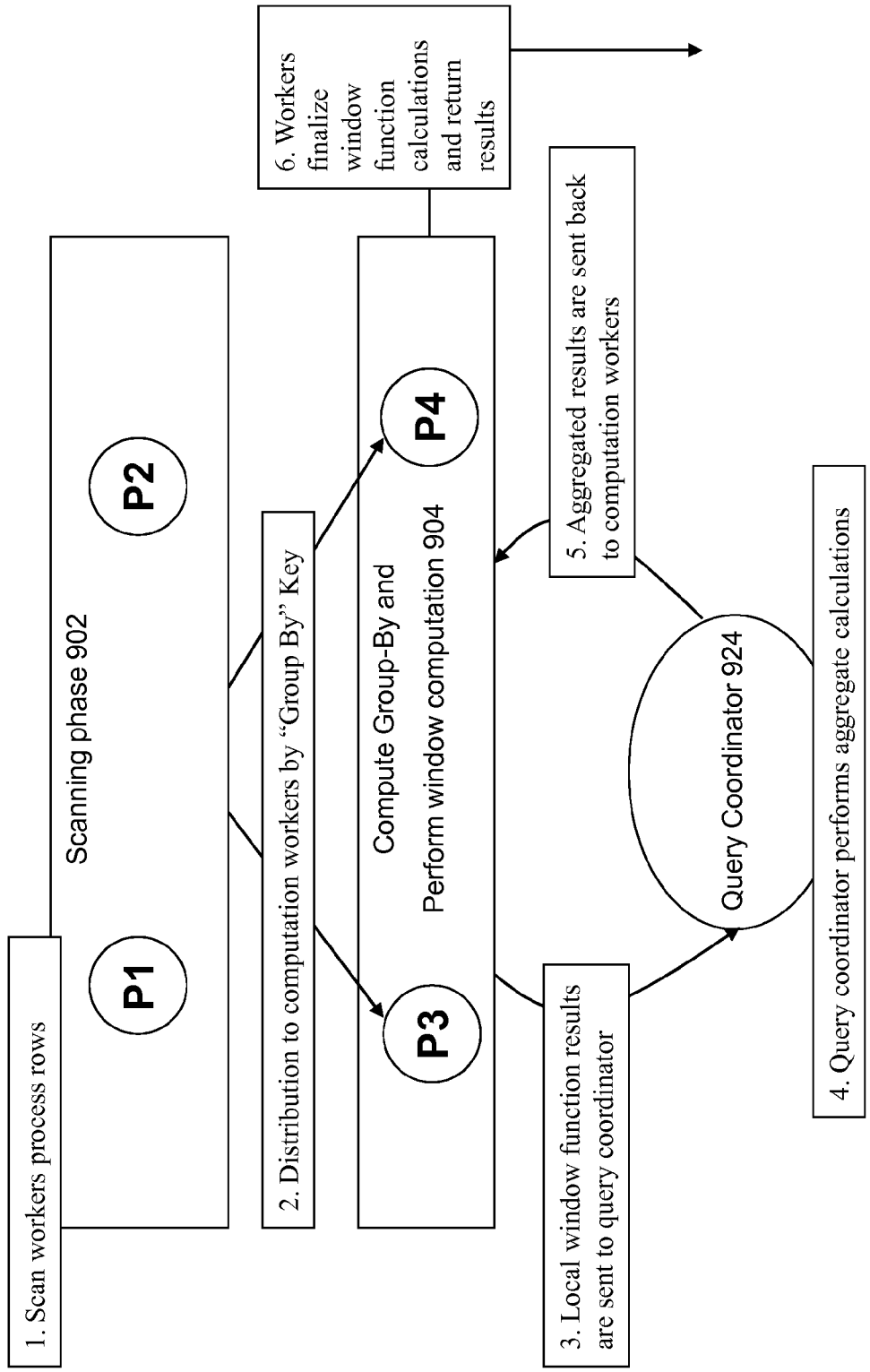
FIG. 9 illustrates the approach of FIG. 8.

FIG. 9 illustrates this sequence of activities in a computing system for handling a window function that includes a GROUP BY clause. At (1), the worker processes P1 and P2 in the combined scan stage 902 will scan the relevant rows from the database. At (2), the scan workers P1 and P2 will distribute the workload to the computation workers P3 and P3 in the GROUP BY and window computation stage 904.

At (3), the local window function computation results are sent from the computation workers P3 and P4 to the query coordinator 924. Next, at (4), the query coordinator 924 performs aggregate computations upon the local window function totals to generate aggregated results. At (5), the aggregated results are sent from the query coordinator 924 to the computation worker processes P3 and P4. Thereafter, the worker processes P3 and P4 will use the aggregated results to perform any needed final calculation to generate final window function computation results. At (6), the final results are sent for display on a display device or sent for storage in a computer readable storage medium.

Therefore, what has been described is an improved approach to handle parallelization of window functions, particularly window functions that do not contain partition keys or which has low cardinality for the partition keys. The embodiments of the invention are highly scalable and can be used to greatly improve query processing.

System Architecture Overview

Figure 10:
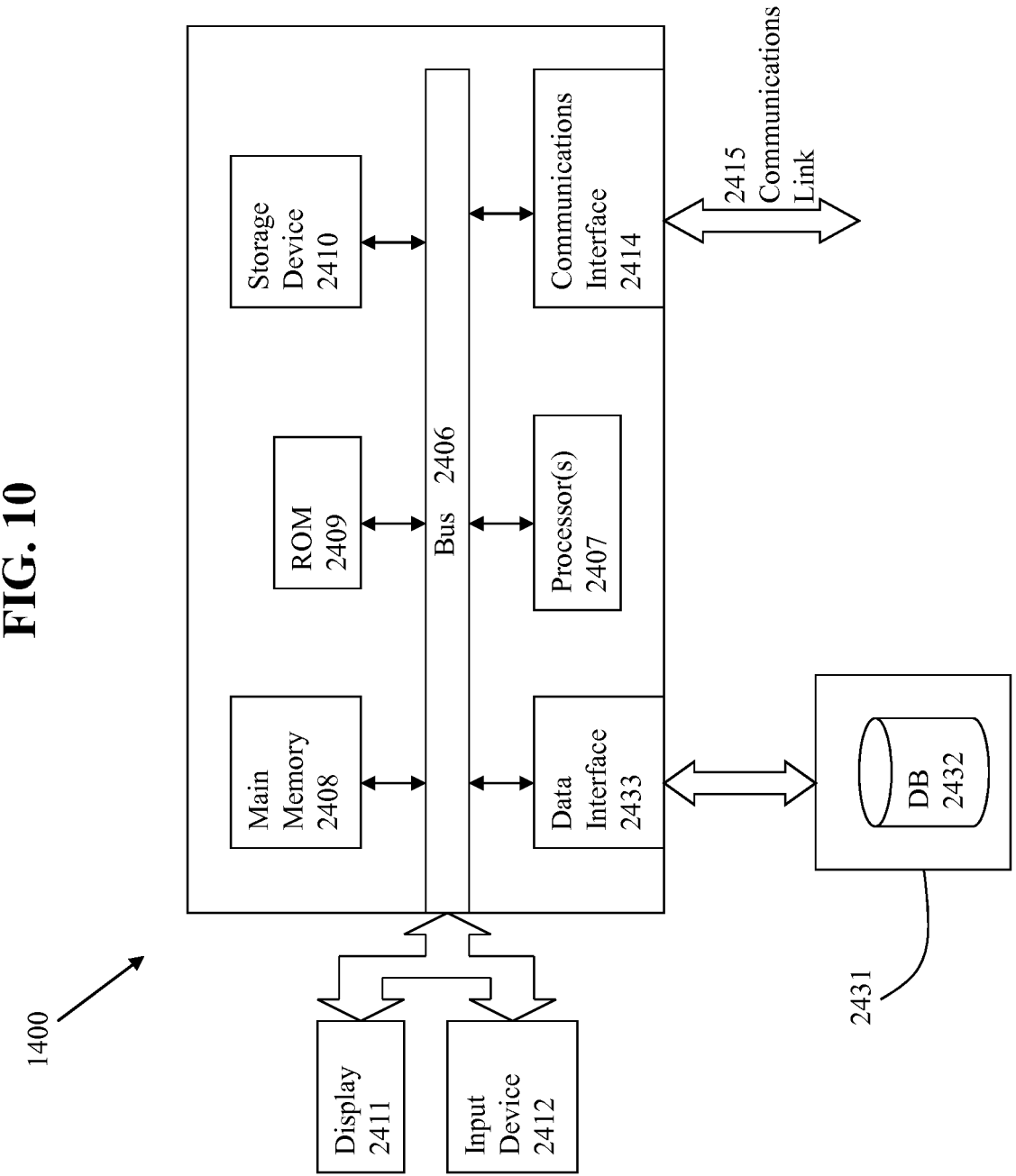
FIG. 10 depicts a computerized system on which a method for re-using digital assertions in a mixed signal context can be implemented.

FIG. 10 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Computer system 1400 may communicate through a data interface 1433 to a database 1432 on an external storage device 1431.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for processing a database query having an aggregation function using a processor, comprising:

determining whether a cardinality problem exists for the aggregation function in the database query, wherein the cardinality problem is identified by comparing a number of available processing entities with a number of partitions associated with the aggregation function;

distributing computation activities for the aggregation function to a plurality of processing entities based at least in part on the result of the determination, where each of the plurality of processing entities performs scanning of a corresponding set of data for the aggregation function in parallel, and also performs computation for the aggregation function in parallel on the corresponding set of data to generate a local result set; and sending the local result set from the plurality of processing entities to a coordinating entity to perform aggregation computations to generate an aggregated result.

2. The method of claim 1 in which the aggregated result is sent to the plurality of processing entities to compute a final result set.

3. The method of claim 1 in which the aggregation function is a summing function.

4. The method of claim 1 in which the processing entity comprises a process, thread, task, processor, or node.

5. The method of claim 1 in which the local result set is associated with a partition key, and the aggregation computations are performed with consideration of the partition key.

6. The method of claim 1 in which the cardinality problem exists when cardinality of the partition keys does not meet a required threshold or when a number of available processing entities exceeds the cardinality of the partition keys by a threshold level.

7. The method of claim 1 wherein the aggregation function is a window function.

8. A computer program product embodied on a non-transitory computer usable storage medium, the computer usable medium having stored thereon a sequence of instructions which, when executed by a processor causes the processor to execute a method for processing a database query having an aggregation function, the method comprising:

determining whether a cardinality problem exists for the aggregation function in the database query, wherein the cardinality problem is identified by comparing a number of available processing entities with a number of partitions associated with the aggregation function;

distributing computation activities for the aggregation function to a plurality of processing entities based at least in part on the result of the determination, where each of the plurality of processing entities performs scanning of a corresponding set of data for the aggregation function in parallel, and also performs computation for the aggregation function in parallel on the corresponding set of data to generate a local result set; and sending the local result set from the plurality of processing entities to a coordinating entity to perform aggregation computations to generate an aggregated result.

9. The computer program product of claim 8 in which the aggregated result is sent to the plurality of processing entities to compute a final result set.

10. The computer program product of claim 8 in which the aggregation function is a summing function.

11. The computer program product of claim 8 in which the processing entity comprises a process, thread, task, processor, or node.

12. The computer program product of claim 8 in which the local result set is associated with a partition key, and the aggregation computations are performed with consideration of the partition key.

13. The computer program product of claim 8 in which the cardinality problem exists when cardinality of the partition keys does not meet a required threshold or when a number of available processing entities exceeds the cardinality of the partition keys by a threshold level.

14. The computer program product of claim 8 wherein the aggregation function is a window function.

15. A computer-based system for processing a database query having an aggregation function, comprising:
 a computer processor to execute a set of program code instructions;
 a memory to hold the program code instructions, in which the program code instructions comprises program code to determine whether a cardinality problem exists for the aggregation function in the database query, wherein the cardinality problem is identified by comparing a number of available processing entities with a number of partitions associated with the aggregation function, distribute computation activities for the aggregation function to a plurality of processing entities based at least in part on the result of the determination, where each of the plurality of processing entities performs scanning of a corresponding set of data for the aggregation function in parallel, and also performs computation for the aggregation function in parallel on the corresponding set of data to generate a local result set; and send the local result set from the plurality of processing entities to a coordinating entity to perform aggregation computations to generate an aggregated result.

16. The system of claim 15 in which the aggregated result is sent to the plurality of processing entities to compute a final result set.

17. The system of claim 15 in which the aggregation function is a summing function.

18. The system of claim 15 in which the processing entity comprises a process, thread, task, processor, or node.

19. The system of claim 15 in which the local result set is associated with a partition key, and the aggregation computations are performed with consideration of the partition key.

20. The system of claim 15 in which the cardinality problem exists when cardinality of the partition keys does not meet a required threshold or when a number of available processing entities exceeds the cardinality of the partition keys by a threshold level.

21. The system of claim 15 wherein the aggregation function is a window function.

22. A computer implemented method for processing a database query having an aggregation function using a processor, comprising:
 determining whether a cardinality problem exists for the aggregation function in the database query, wherein the cardinality problem is identified by comparing a number of available processing entities with a number of partitions associated with the aggregation function, and further determining whether the query is associated with one or more groups;
 distributing computation activities for the aggregation function to a plurality of scanning processing entities based at least in part on the result of the determination, where each of the plurality of processing entities performs scanning of data for the aggregation function in parallel;
 distributing workloads based at least in part upon the corresponding data to a plurality of computation processing entities, where the plurality of computation processing entities performs computation for the aggregation function on the workloads to generate a local result set; and
 sending the local result set from the plurality of processing entities to a coordinating entity to perform aggregation computations to generate an aggregated result.

23. The method of claim 22 in which the workloads are distributed to the computation processing entities based at least in part upon one or more groups associated with the query.

24. The method of claim 22 in which the aggregated result is sent to the plurality of computation processing entities to compute a final result set.

25. The method of claim 22 in which the cardinality problem exists when cardinality of the partition keys does not meet a required threshold or when a number of available processing entities exceeds the cardinality of the partition keys by a threshold level.

26. The method of claim 22 wherein the aggregation function is a window function.

27. A computer program product embodied on a non-transitory computer usable storage medium, the computer usable medium having stored thereon a sequence of instructions which, when executed by a processor causes the processor to execute a method for processing a database query having an aggregation function, the method comprising:
 determining whether a cardinality problem exists for the aggregation function in the database query, wherein the cardinality problem is identified by comparing a number of available processing entities with a number of partitions associated with the aggregation function, and further determining whether the query is associated with one or more groups;
 distributing computation activities for the aggregation function to a plurality of scanning processing entities based at least in part on the result of the determination, where each of the plurality of processing entities performs scanning of data for the aggregation function in parallel;
 distributing workloads based at least in part upon the corresponding data to a plurality of computation processing entities, where the plurality of computation processing entities performs computation for the aggregation function on the workloads to generate a local result set; and
 sending the local result set from the plurality of processing entities to a coordinating entity to perform aggregation computations to generate an aggregated result.

28. The computer program product of claim 27 in which the workloads are distributed to the computation processing entities based at least in part upon one or more groups associated with the query.

29. The computer program product of claim 27 in which the aggregated result is sent to the plurality of computation processing entities to compute a final result set.

30. The computer program product of claim 27 in which the cardinality problem exists when cardinality of the partition keys does not meet a required threshold or when a number of available processing entities exceeds the cardinality of the partition keys by a threshold level.

31. The computer program product of claim 27 wherein the aggregation function is a window function.

32. A computer-based system for processing a database query having a an aggregation function, comprising:
 a computer processor to execute a set of program code instructions;
 a memory to hold the program code instructions, in which the program code instructions comprises program code to determine whether a cardinality problem exists for the aggregation function in the database query, wherein the cardinality problem is identified by comparing a number of available processing entities with a number of partitions associated with the aggregation function, and further determining whether the query is associated with one or more groups, distribute computation activities for the aggregation function to a plurality of scanning processing entities based at least in part on the result of the determination, where each of the plurality of processing entities performs scanning of data for the aggregation function in parallel;

distribute workloads based at least in part upon the corresponding data to a plurality of computation processing entities, where the plurality of computation processing entities performs computation for the aggregation function on the workloads to generate a local result set;

and send the local result set from the plurality of processing entities to a coordinating entity to perform aggregation computations to generate an aggregated result.

33. The system of claim 32 in which the workloads are distributed to the computation processing entities based at least in part upon one or more groups associated with the query.

34. The system of claim 32 in which the aggregated result is sent to the plurality of computation processing entities to compute a final result set.

35. The system of claim 32 in which the cardinality problem exists when cardinality of the partition keys does not meet a required threshold or when a number of available processing entities exceeds the cardinality of the partition keys by a threshold level.

36. The system of claim 32 wherein the aggregation function is a window function.

* * * * *

UNITED STATES PATENT AND TRADEMARK OFFICE
CERTIFICATE OF CORRECTION

PATENT NO.        : 8,650,208 B2
APPLICATION NO.   : 12/848018
DATED             : February 11, 2014
INVENTOR(S)       : Bellamkonda It is certified that error appears in the above-identified patent and that said Letters Patent is hereby corrected as shown below:

On Title page, column 2, under Other Publications, line 16, delete "teh" and insert -- the --, therefor.

On Title page, column 2, under Other Publications, line 19, delete "SIGMON," and insert -- SIGMOD, --, therefor.

In the Specification

In column 4, line 1, delete "ser" and insert -- user --, therefor.

In column 6, line 22, delete "Sum( )" and insert -- Sum( ), --, therefor.

In column 9, line 40, delete "PTSN," and insert -- PSTN, --, therefor.

In the Claims

In column 12, line 60, in Claim 32, delete "a an" and insert -- an --, therefor.

Signed and Sealed this
First Day of July, 2014

Michelle K. Lee
*Deputy Director of the United States Patent and Trademark Office*